(12) United States Patent
Nishi (10) Patent No.: US 6,781,931 B2
(45) Date of Patent: *Aug. 24, 2004

(54) OPTICAL INFORMATION RECORDING/ REPRODUCING APPARATUS AND OPTICAL PICKUP APPARATUS

(75) Inventor: Noriaki Nishi, Tokyo (JP)

(73) Assignee: Sony Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,600

(22) Filed: Dec. 13, 1999

(65) Prior Publication Data

US 2003/0021197 A1 Jan. 30, 2003

(30) Foreign Application Priority Data

Dec. 15, 1998 (JP) .......................................... P10-355971

(51) Int. Cl.[7] .................................................. G11B 7/00
(52) U.S. Cl. .................................. 369/44.41; 369/44.32
(58) Field of Search ........................... 369/44.23, 44.29, 369/44.32, 112.21, 44.41, 44.42, 44.12

(56) References Cited

U.S. PATENT DOCUMENTS

| | | | | |
|---|---|---|---|---|
| 4,897,828 A | * | 1/1990 | Yoshitoshi et al. | 369/44.23 |
| 4,908,506 A | * | 3/1990 | Coops et al. | 369/44.11 |
| 5,144,606 A | * | 9/1992 | Kadowaki | 369/44.41 |
| 5,181,193 A | * | 1/1993 | Kume et al. | 369/44.23 |
| 5,408,450 A | * | 4/1995 | Nagahama et al. | 369/44.12 |
| 5,727,111 A | * | 3/1998 | Kume et al. | 369/44.23 |
| 5,777,975 A | * | 7/1998 | Horinouchi et al. | 369/112.21 |
| 5,790,502 A | * | 8/1998 | Horinouchi et al. | 369/112.21 |
| 5,828,643 A | * | 10/1998 | Takeda et al. | 369/112.12 |
| 5,903,529 A | * | 5/1999 | Nishi et al. | 369/44.23 |
| 6,014,354 A | * | 1/2000 | Nomura et al. | 369/44.28 |
| 6,256,285 B1 | * | 7/2001 | Coombs | 369/112.03 |
| 6,339,562 B1 | * | 1/2002 | Sakai | 369/44.12 |

FOREIGN PATENT DOCUMENTS

JP        05120754 A  *  5/1993  ........... G11B/11/10

* cited by examiner

Primary Examiner—Thang V. Tran
(74) Attorney, Agent, or Firm—Rader, Fishman & Grauer PLLC; Ronald P. Kananen

(57) ABSTRACT

The invention relates to an optical information recording/reproduction apparatus and an optical pickup apparatus in which the configuration of a light receiving element is optimized particularly in a focus error signal and/or tracking error signal. Thereby, the offset due to the stray light generated from the light emitted from a light emitting element which is incident directly onto the light receiving element without incidence onto a recording medium is equalized approximately to 0.

24 Claims, 9 Drawing Sheets

FIG. 12A FOCUS ERROR SIGNAL (S-SHAPE CURVE) / OFFSET DUE TO STRAY BEAM

FIG. 12B MD

FIG. 12C GAIN IS APPLIED TO THE SIGNAL IN FIG.12B

FIG. 13C

FIG. 13A ADDED ELECTRIC OFFSET

FIG. 13B

OPTICAL INFORMATION RECORDING/REPRODUCING APPARATUS AND OPTICAL PICKUP APPARATUS

BACKGROUND OF THE INVENTION

1. Field of the Invention

This invention relates to an optical information recording/reproduction apparatus, and more particularly relates to an optical information recording/reproduction apparatus which is capable of eliminating offset due to generation of stray light (light emitted from a light emitting element which is incident directly to a light receiving element not by way of a recording medium) in a focus error signal and/or tracking error signal.

2. Description of Related Art

A pickup module having a light emitting element (for example, a laser diode) and a light receiving element (for example, photo diode) in a unit has been developed in order to realize a small sized, thin, and highly reliable optical pickup used for CD (Compact Disk) or MD (Mini Disk), or the like.

In the above-mentioned pickup module, stray light that is a light emitted from a light emitting element incident directly to a light receiving element not by way of a recording medium can be generated. As the result, in the case that the intensity of a stray light is relatively larger than that of returning light (the light that is reflected by the optical disk surface and returned on the same optical path out of the light emitted from the light emitting element), the stray light causes the offset which is not negligible in a focus error signal and/or tracking error signal.

Figures 12A, 12B:
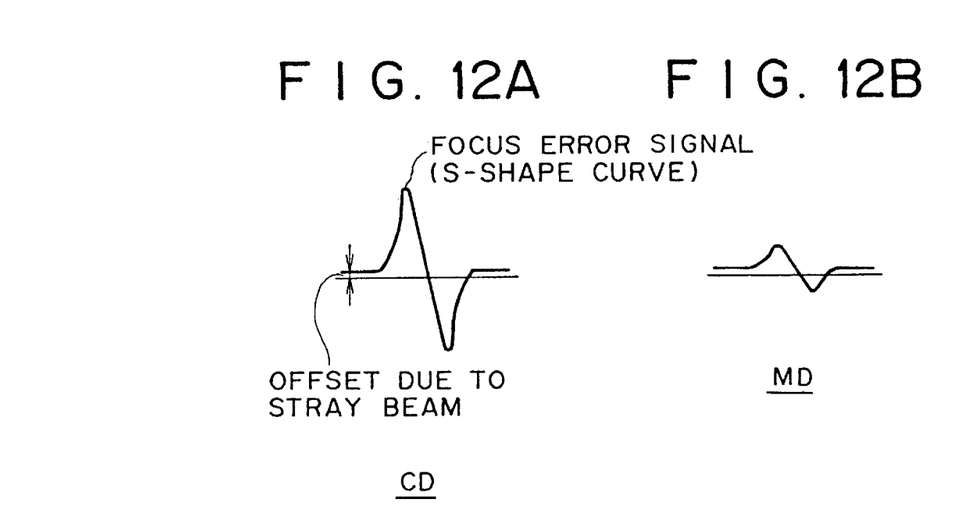
FIG. 12A to FIG. 12C are diagrams for describing the stray beam offset generated in the focus error signal.

For example, in the case of an optical disk for only reproduction such as CD, the relation between the focus error signal and the offset due to the stray light is shown in FIG. 12A. As shown in FIG. 12A, a focus error signal is a signal of S-shaped characteristic. In the case of CD, because the reflectance of the light is as high as about 70%, the proportion of the offset due to the stray light is relatively smaller than that of the focus error signal.

Figure 12C:
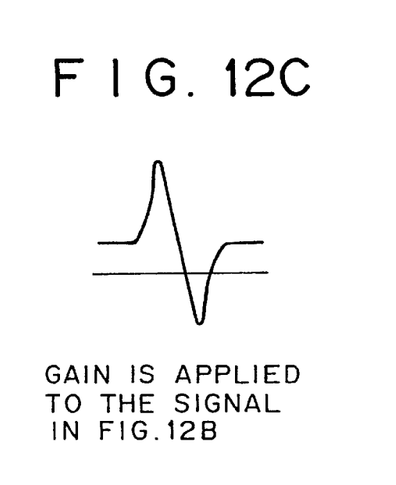

On the other hand, in the case of the writable optical disk such as CD-RW (Compact Disk-ReWritable) and DVD-RAM (Digital Versatile Disk-Random Access Memory), the relation between the offset due to the stray light and the focus error signal is shown in FIG. 12B. FIG. 12C is a diagram which is obtained by amplifying the focus error signal shown in FIG. 12B so that the amplitude is equal to that of S-shaped curve shown in FIG. 12A. As shown in FIG. 12B and FIG. 12C, in the case of the writable optical disk such as MD, CD-RW, and DVD-RAM, because the light reflectance is as relatively as low as 10 to 30% (returning light is reduced) in comparison with in the case of CD-ROM, the proportion of offset due to the stray light is relatively larger than that of the focus error signal and is not negligible.

Figures 13A, 13B:
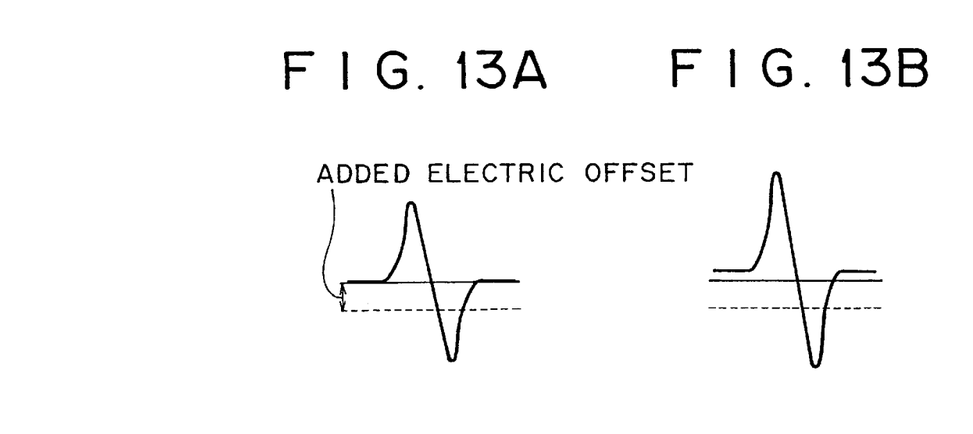
FIG. 13A to FIG. 13C are diagrams for describing the stray beam offset generated in the focus error signal.

FIG. 13A shows a diagram obtained by offsetting the offset due to the stray light with adding electric offset to the focus error signal shown in FIG. 12C.

However, this method is disadvantageous in that the offset component due to stray light re-appears as shown in FIG. 13B when the sensitivity of a light receiving element is changed concomitantly with the external temperature change or when the emission power of a light emitting element becomes large from the state of FIG. 13A.

Figure 13C:
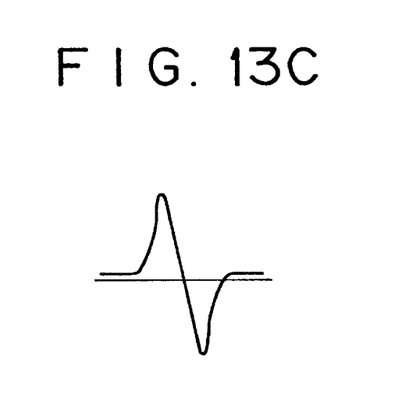

Furthermore, as shown in FIG. 13C, even in the case that the gain is applied to the focus error signal shown in FIG. 13B so that the amplitude is equalized to the amplitude of the S-shaped curve shown in FIG. 13A, this method is disadvantageous in that the offset is generated.

SUMMARY OF THE INVENTION

The present invention was accomplished to solve the above-mentioned invention, it is the object of the present invention to provide an optical information recording/reproduction apparatus which is capable of eliminating the offset in the focus error signal to 0 even when the sensitivity of a light receiving element is changed due to external temperature change or when the emission power of a light emitting element becomes large.

An optical information recording/reproduction apparatus of the present invention comprises a light emitting means for emitting a beam to an optical recording medium, a light receiving means for receiving a returning light from the recording medium disposed near the light emitting means, a focus error operation means for computing a focus error signal using an electric signal generated from the light receiving means, and a tracking error operation means for computing a tracking error signal using an electric signal generated from the light receiving means, wherein the configuration of the light receiving means is optimized so that the offset of an electric signal sent out to at least one of the focus error operation means and the tracking error operation means is equalized to approximately 0.

In the information recording/reproduction apparatus of the present invention, the configuration of the light receiving means is optimized so that the offset is equalized to approximately 0.

DETAILED DESCRIPTION OF THE PREFERRED EMBODIMENTS

Embodiments of the present invention will be described in detail hereinafter, to clarify the relation between means of the present invention described in claims and corresponding components (one example for each means) described in embodiments, corresponding components described in embodiments are added in parentheses after respective means, and the characteristics of the present invention is described herein under. However, the present invention will not be limited by the described means.

An optical information recording/reproduction apparatus of the present invention comprises a light emitting means (for example, the laser diode 31 shown in FIG. 2) for emitting a beam to an optical recording medium, a light receiving means (for example, the photo diodes 32 to 34 shown in FIG. 5) for receiving a returning beam from the recording medium disposed near the light emitting means, a focus error operation means (for example, the focus error operation unit 52 shown in FIG. 5) for computing a focus error signal using an electric signal generated from the light receiving means, and a tracking error operation means (for example, the tracking error operation unit 53 shown in FIG. 5) for computing a tracking error signal using an electric signal generated from the light receiving means, wherein the configuration of the light receiving means is optimized so that the offset of an electric signal sent out to at least one of the focus error operation means and the tracking error operation means is equalized to 0.

Figure 1:
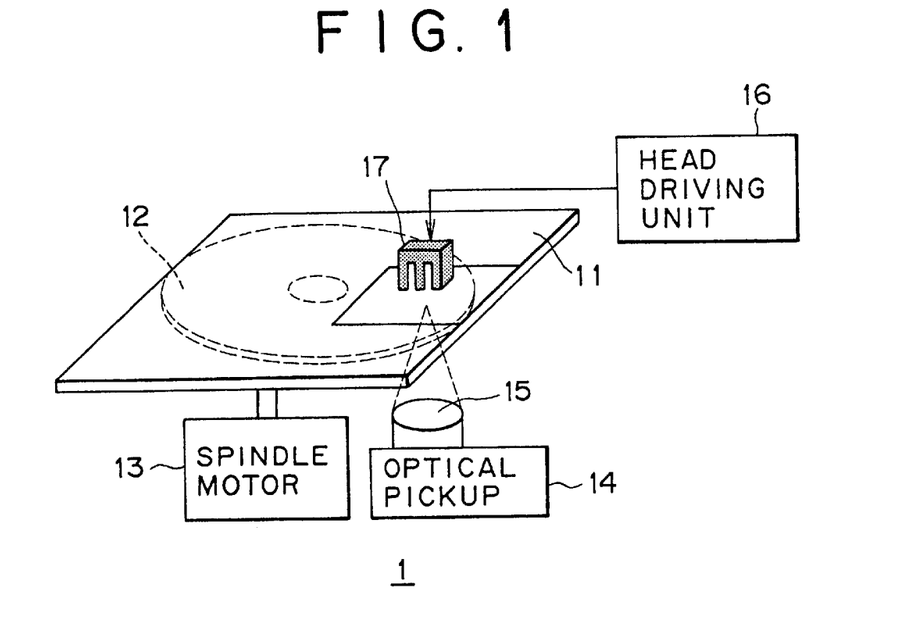
FIG. 1 is a diagram for illustrating the structure of one embodiment of a mini disk apparatus 1 to which the present invention is applied.

FIG. 1 shows a diagram for illustrating the structure of an embodiment of a mini-disk (MD) apparatus to which the present invention is applied.

A magneto-optical disk 12 is contained in the internal of a cartridge 11, and the optical disk 12 is rotated at a predetermined speed by a spindle motor 13.

When data is recorded in the magneto-optical disk 12, a laser beam emitted from a laser diode (LD) not shown in the drawing located in an optical pickup 14 (details will be described hereinafter) is converged on the magneto-optical disk 12 by an object lens 15, and the temperature of the recording film (not shown in the drawing) is raised to a temperature higher than the curie point (the temperature at which the coercive force becomes 0). A head driving unit 16 supplies an audio signal to be recorded to a recording head 17 as a head driving signal (current) to thereby determine the magnetization direction of the recording track where the temperature is raised to the curie temperature. In other words, the audio signal is recorded by means of the head driving unit 16.

When the optical disk 12 is reproduced, the reflected beam (returning beam) of the laser beam converged on the magneto-optical disk 12 passes through the object lens 15, and is detected by a photo diode (PD) not shown in the drawing disposed in the internal of the optical pickup 14. A focus error signal and tracking error signal are generated using the signal detected by the photo diode.

Figure 2:
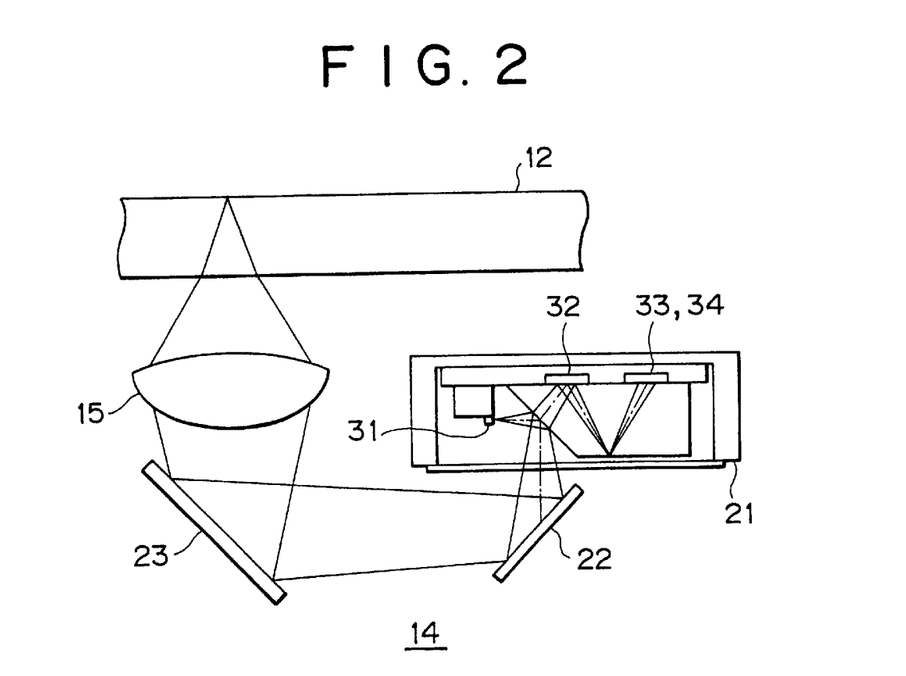
FIG. 2 is a diagram for illustrating the structure of the first embodiment of an optical pickup 14.
Figure 3:
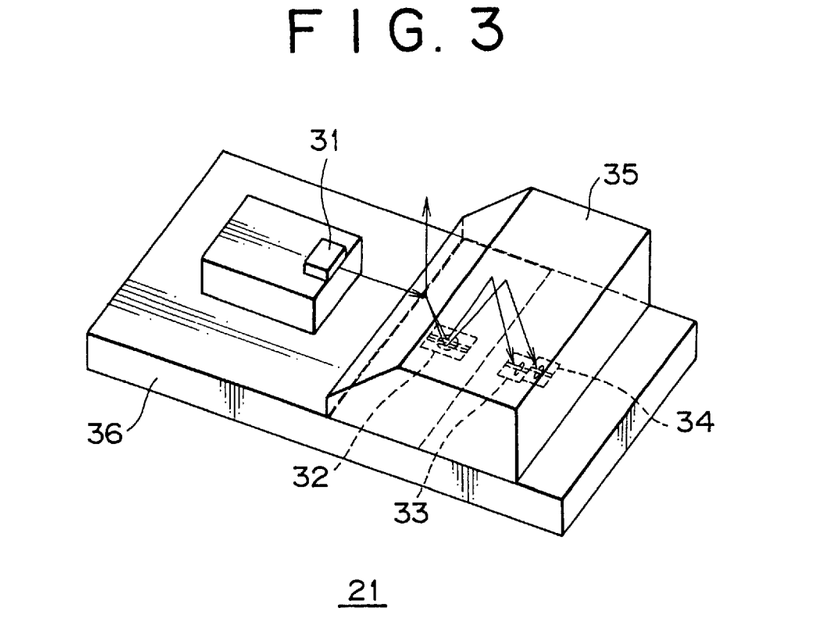
FIG. 3 is an apparent perspective view of an optical pickup module 21.
Figure 4:
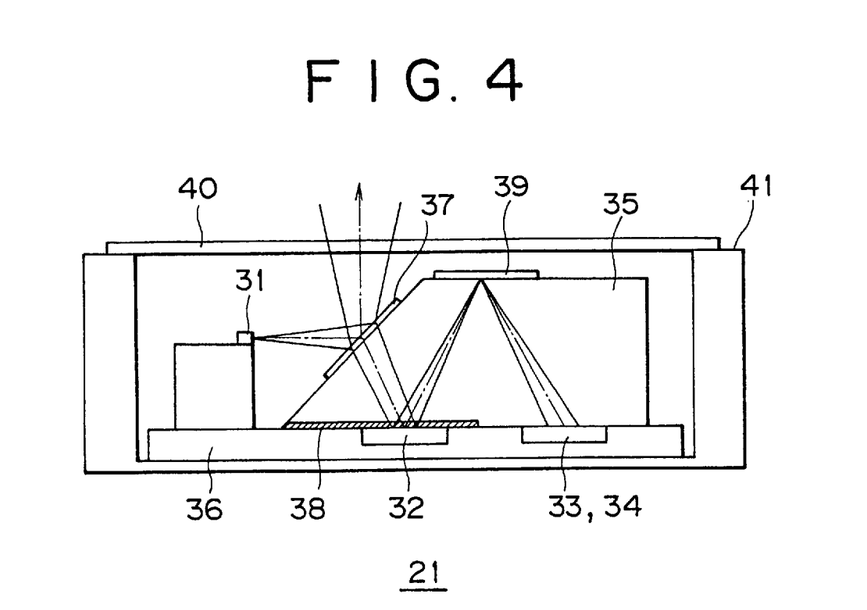
FIG. 4 is a cross sectional view of the optical pickup module 21.

Next, the optical pickup 14 is described in detail with reference on FIG. 2 to FIG. 4. FIG. 2 is a diagram for illustrating the structure of the first embodiment of the optical pickup 14. FIG. 3 is an apparent perspective view of an optical pickup module 21 shown in FIG. 2. FIG. 4 is a cross sectional view of the optical pickup module 21.

The optical pickup 14 comprises the optical pickup module 21 having a box in which the laser diode (LD) 31 namely a light emitting element and photo diodes (PD) 32 to 34 namely light receiving elements are contained together as shown in FIG. 2.

The optical pickup module 21 has photo diodes 32 to 34 which are formed on a semiconductor substrate 36 as shown in FIG. 3 and FIG. 4. A laser diode 31 and a birefringent prism 35 are provided on the semiconductor substrate 36. A semi-transparent film 38 is formed partially (selectively) between the bottom of the birefringent prism 35 and the semiconductor substrate 36. A semi-transparent film 37 is formed on the slant surface of the birefringent prism 35, and a total reflection film 39 is formed on the top surface of the birefringent prism 35. The laser diode 31, the birefringent prism 35, and semiconductor substrate 36 are disposed in the box 41, and a transparent cover plate 40 is provided on the top side of the box 41.

A laser beam emitted from the laser diode 31 is irradiated onto the birefringent prism 35 having a trapezoidal cross section. The irradiated laser beam is reflected by the semi-transparent film 37 formed on the slant top surface of the birefringent prism 35, and the reflected beam passes through the transparent cover plate 40 is reflected by the reflection mirrors 22 and 23, and converged on the magneto-optical disk 12 by the object lens 15.

The laser beam reflected by the magneto-optical disk 12 passes through the object lens 15, is reflected by the reflection mirrors 22 and 23, and is incident onto the transparent cover plate 40 as a returning beam. The returning beam passes through the semi-transparent film 37, and is guided to the internal of the birefringent prism 35. The returning beam guided into the internal of the birefringent prism 35 passes through the semi-transparent film 38, and is irradiated onto the photo diode 32. The returning beam reflected by the semi-transparent film 38 is reflected by the total reflection film 39, and is irradiated onto the photo diodes 33 and 34. The photo diodes 32 to 34 convert the intensity of the returning beams to outputs.

Figure 5:
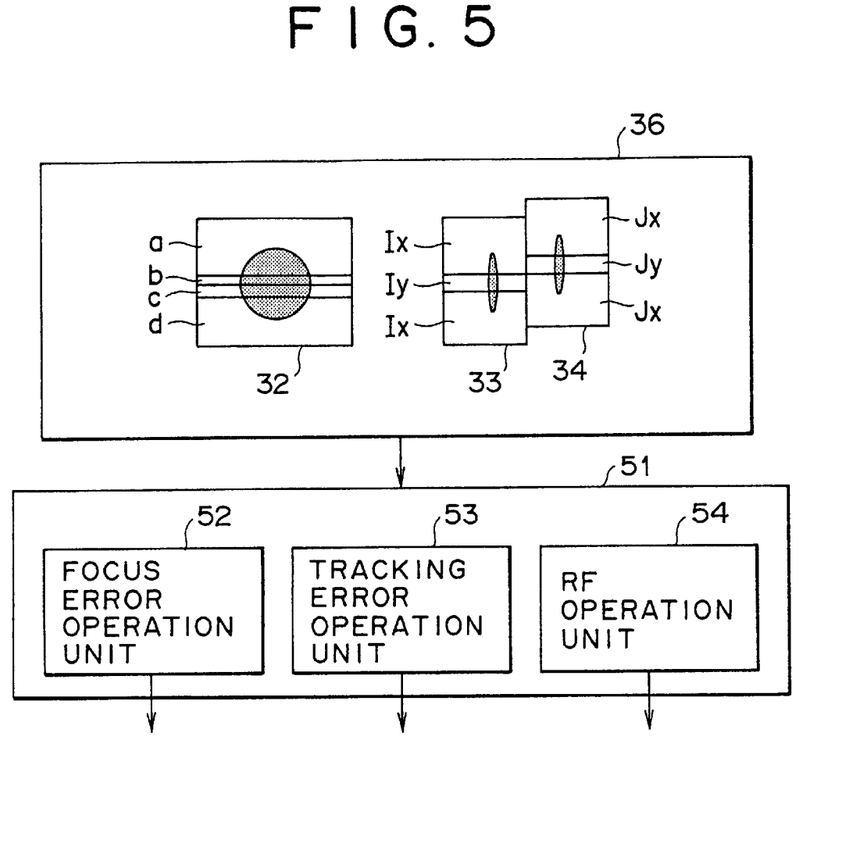
FIG. 5 is a diagram for illustrating the configuration of photo diodes 32 to 34.
Figure 6:
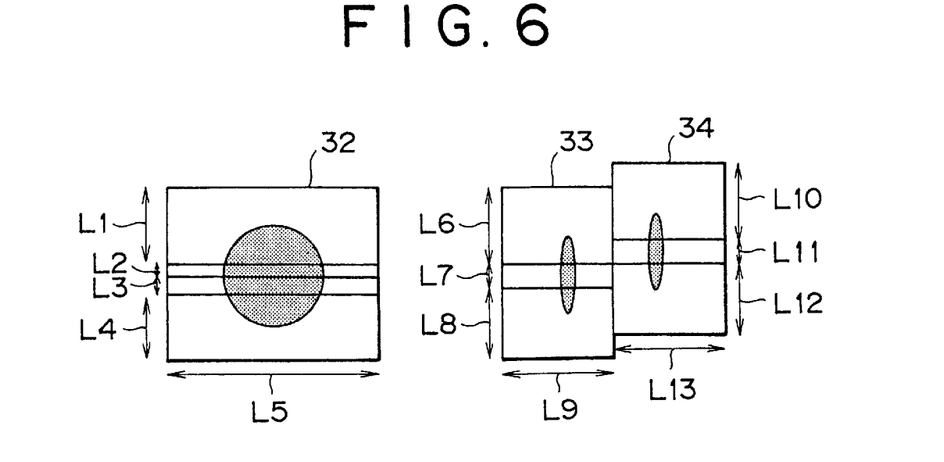
FIG. 6 is a diagram for illustrating the size of the photo diodes 32 to 34.

Next, a process for offsetting the offset due to stray light to 0 (offset) in a focus error signal generated using the electric signal generated from the photo diodes 32 to 34 is described with reference to FIG. 5 and FIG. 6. FIG. 5 is a diagram for illustrating the configuration of the photo diodes 32 to 34. FIG. 6 is a diagram for illustrating the size of the photo diodes 32 to 34.

As shown in FIG. 5, the photo diodes 32 is divided into four sections, the area of these sections is represented by a, b, c, and d respectively from the top. The photo diode 33 is divided into three sections, the area of these sections is represented by $I_X$, $I_Y$, and $I_Y$ respectively from the top. The photo diode 34 is divided into three sections, and the area of these sections is represented by $J_X$, $J_Y$, $J_X$ respectively from the top. The focus error operation unit 52 of the operation unit 5 computes the equation (1) described herein under to generate a focus error signal.

$$\text{Focus error signal} = \{(a+d)-(b+c)\}-K\{(I_X-I_Y)+(J_X-J_Y)\} \quad (1)$$

In the above-mentioned equation (1) K is a constant. Characters represent the output of the photo diode having the area represented by the corresponding character, and $I_X$ represents the value formed by adding respective outputs of the top side and bottom side photo diodes. Similarly, $J_X$ represents the value formed by adding respective outputs of top side and bottom side photo diodes.

Herein for the purpose of simplification, it is assumed that K=1 and the stray beam intensity incident to the photo diodes 32 to 34 is uniform. It is assumed that the stray beam intensity is uniform, then the stray beam off set generated from the photo diodes 32 to 34 is proportional to the area of the photo diodes.

For example, it is assumed that L1=L4=L6=L8=L10= L12=0.4, L2=L3=0.1, L7=L11=0.2, L5=1.5, and L9=L13= 1.0 (all these values are dimension-less) for the size of photo diodes as shown in FIG. 6, then from the equation (1), the stray beam offset generated in the focus error signal is proportional to $$((0.6+0.6)-(0.15+0.15))-1((0.8-0.2)+(0.8-0.2))=-0.3$$

If the L5=1.5 is changed to L5=2.0 while the relations L1=L4=L6=L8=L10=L12=0.4, L3=0.1, L7=L11=0.2, and L9=L13=1.0 remain unchanged for the size of the photo diode, then the stray beam offset generated in the focus error signal is 0 based on the equation (1).

Furthermore, if the L9=L13=1.0 is changed to L9=L13=0.75 while the relations L1=L4=L6=L8=L10=L12=0.4, L2=L3=0.1, L7=L11=0.2, and L5=1.5 are remain unchanged for the size of the photo diode, then the stray beam offset generated in the focus error signal is 0 based on the equation (1). As the result, the stray beam offset can be equalized to 0 without adjustment of the size of the photo diode 32 which receives the main beam.

Furthermore, if the L6=L8=L10=L12=0.4 is changed to L6=L8=L10=L12=0.325 while the relations L1=L4=0.4, L2=L3=0.1, L7=L11=0.2, L5=1.5, and L9=L13=1.0 remain unchanged for the size of the photo diode, then the stray beam offset generated in the focus error signal is 0 based on the equation (1). As the result, the stray beam offset can be equalized to 0 without adjustment of the size of the photo diode 32 which receives the main beam.

Though it is assumed that the stray beam intensity is uniform for the purpose of simplification in the above-mentioned first embodiment, the stray beam intensity is not uniform actually. However, in the case that the stray beam intensity is not uniform, the stray beam offset generated in the focus error signal can be equalized to 0 by optimizing the configuration (size) of the photo diodes 32 to 34 in the same manner as described herein above.

A tracking error operation unit 53 and an RF operation unit 54 compute the equation (2) and equation (3) described herein under to generate a tracking error signal and MO (magnetic Optical) RF signal respectively.

Tracking error signal=(a+b)−(c+d)　　　(2)

MORF signal=$(I_X+I_Y)-(J_X+J_Y)$　　　(3)

Therefore, even though the configuration (size) of the photo diodes 32 to 34 is changed, the tracking error signal and the MO signal are not subjected to the influence as long as the returning beam does not deviate beyond the edge of the configuration.

Figure 7:
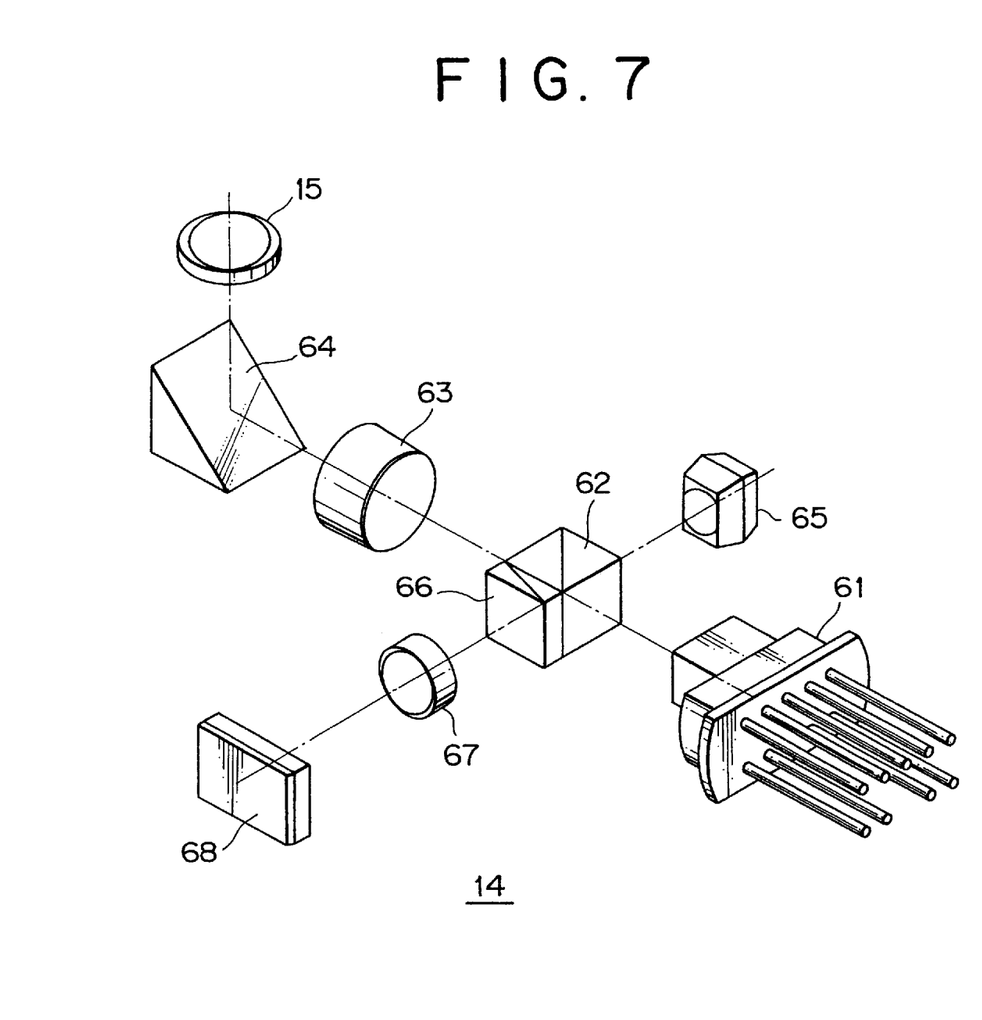
FIG. 7 is a diagram for illustrating the structure of the second embodiment of an optical pickup 14.
Figure 8A:
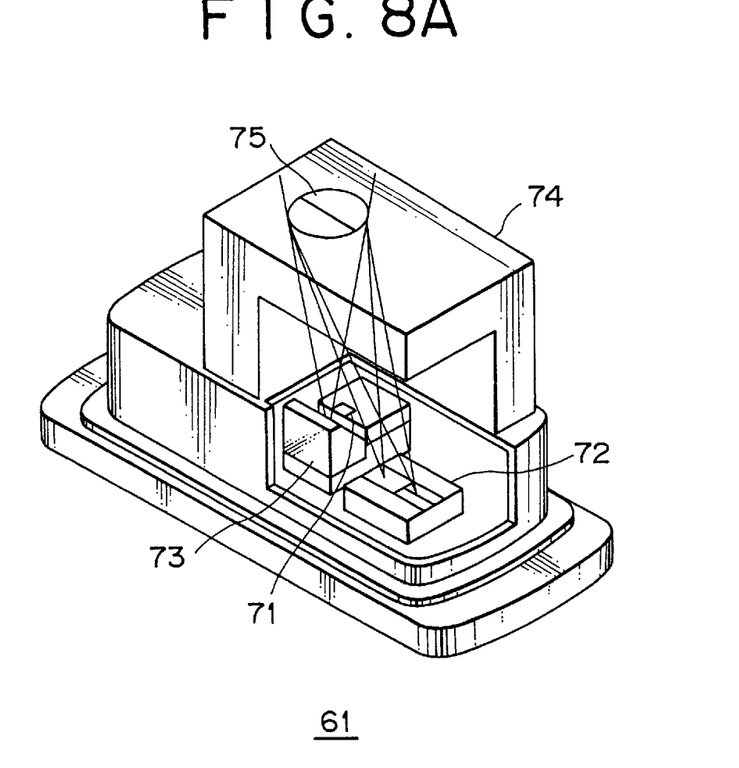
FIG. 8A and FIG. 8B are apparent perspective views of a hologram laser 61.

Next, the second embodiment of the optical pickup 14 is described hereinafter with reference to FIG. 7, FIG. 8A, and FIG. 8B. FIG. 7 shows the structure of the second embodiment of the optical pickup 14. FIG. 8A is an apparent perspective view of a hologram laser 61 shown in FIG. 7.

As shown in FIG. 7, the optical pickup 14 comprises a hologram laser 61, a PBS (polarized Beam Splitter) 62, a flat concave lens 67, and an RF receiving element 68.

A laser beam emitted from the laser diode 71 in the hologram laser 61 is reflected by a 45 degree mirror 73. The reflected beam is incident on a grating (not shown in the drawing) formed on the under side of the hologram element 74, and split into the main beam (0 order beam) to be used for reading the RF signal and focus servo and two sub-beams (± first order diffracted beams) used for tracking servo. The branched laser beams pass through a hologram 75 formed on the top side of the hologram element 74.

The laser beam which has passed the hologram 75 passes through PBS (Polarized Beam Splitter) 62 and collimator lens 63, and is reflected by the 45 degree mirror 64. The reflected beam is converged on the magneto-optical disk 12 by the object lens 15. Because the laser beam has been split into one main beam and two sub-beams by the grating in the hologram laser 61, corresponding three spots are converged on the magneto-optical disk 12.

The laser beam reflected by the magneto-optical disk 12 (returning beam) passes the object lens 15, the 45 degree mirror 64, and collimator lens 63, and is incident onto the PBS 62 again. The returning beam 62 that has passed the PBS 62 is incident onto the hologram 75. The incident returning beam is diffracted by the hologram 75, converged on a 5-division photo diode 72, and detected as a focus error signal based on the Foucault method.

On the other hand, the reflected beam from the PBS 62 is divided into polarized components perpendicular each other by Wollaston prism 66, and six spots including main beam and sub-beams are converged on the RF beam receiving element 68 by the flat concave lens 67. The RF beam receiving element 68 performs the predetermined operation based on the converged beam to generate an RF signal. The APC (Automatic Power Control) beam receiving element 65 performs a predetermined operation based on the converged beam to generate an APC signal for controlling the optical output.

Next, a method for equalizing the offset due to stray beam of the focus error signal to 0 (offset) is described with reference to FIG. 8B.

Figure 8B:
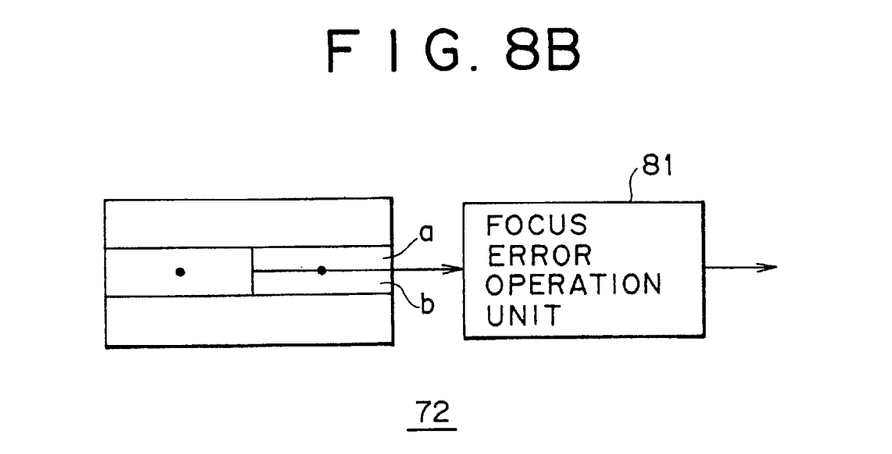

As shown in FIG. 8B, the 5 division photo diode 72 is divided into five sections, converts the detected beam signal into an electric signal, and supplies the converted electric signal to a focus error operation unit 81. The focus error operation unit 81 computes the following equation (4) to generate a focus error signal.

Focus error signal=a−b　　　(4)

Herein, a and b represent the output of the photo diode having the area represented by the corresponding character.

For example, in the case that the intensity ratio of stray beam is a:b=1:1.2 in FIG. 8B, the stray beam offset is generated in the focus error signal. By reducing the configuration of b (size) so as to be a:b=1:1, the stray beam offset generated in the focus error signal can be equalized to 0.

Figure 9:
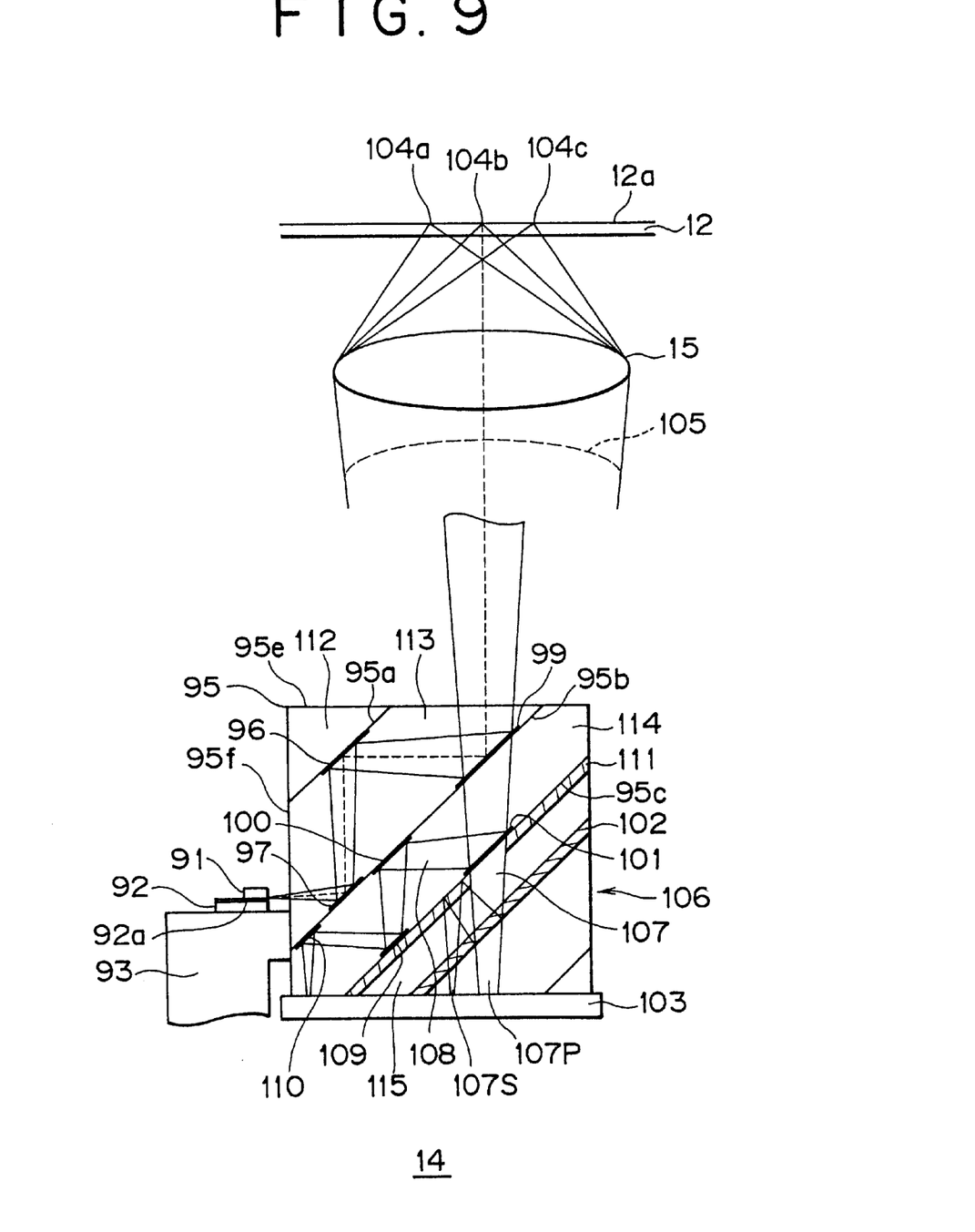
FIG. 9 is a diagram for illustrating the structure of the third embodiment of an optical pickup 14.
Figure 10:
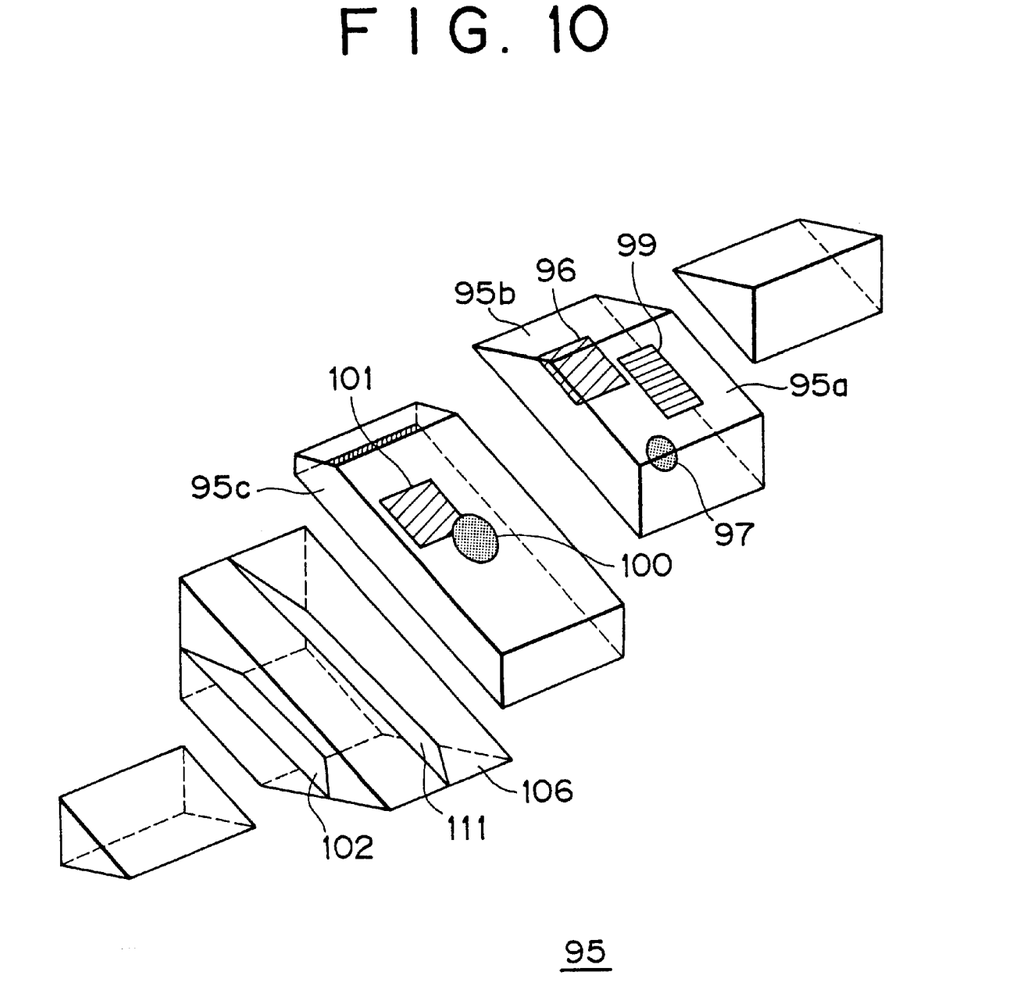
FIG. 10 is a perspective view of an optical guide member 9.

Next, the third embodiment of the optical pickup 14 is described with reference to FIG. 9 and FIG. 10. FIG. 9 is a diagram for illustrating the structure of the third embodiment of the optical pickup 14. FIG. 10 is a perspective view of an optical guide member 95 shown FIG. 9.

As shown in FIG. 9, the optical pickup 14 comprises a block 93, a sub-mount 92 provided horizontally on the block 93, a laser diode (LD) 91 provided on the sub-mount 92, the optical guide 95, and a PDIC (Photo Diode IC) 103. The optical guide member 95 is a rectangle having a plurality of slant surfaces and various films formed on the slant surfaces which functions to send out the beam emitted from the laser diode 91 and to guide the returning beam to a predetermined position. The PDIC 103 comprises various electric circuits formed on a plate like semiconductor substrate.

The laser beam emitted from the laser diode 91 is incident into the optical guide member 95 from the surface 95f of the optical guide member 95, and reaches to a diffusion angle conversion hologram 97 formed on the second slant surface 95b. The diffusion angle of the laser beam which has reached to the diffusion angle conversion hologram 97 is converted by the diffusion angle conversion hologram 97, and reaches to a reflection type diffraction grating 96 formed on the first slant surface 95a. The laser beam which has reached to the diffraction grating 96 is divided into the 0 order diffracted beam (main beam) and ± first diffracted beams (sub-beams) by the diffraction grating 96.

The main beam and sub-beams generated by the diffraction grating 96 is incident onto the first beam splitter film 99, which is a selectively polarizing film. The beam which is allowed to pass the first beam splitter film 99 out of the beam incident into the first beam splitter film 99 is used as a monitor beam of the exiting beam from the laser diode 91.

The main beam and sub-beams reflected by the first beam splitter film 99 pass through the slant surface 95e of the beam guide member 95. The beam which has passed the surface 95e is incident into the object lens 15, and focused on the recording medium surface 12a of the magneto-optical disk 12 by means of the convergent action of the object lens 15. At that time, beam spots 104a and 104c of two sub-beams are focused on the approximately symmetrical positions with respect to the beam spot 104b of the main beam on the recording medium surface 12a. The beam spot 104b of the main beam and beam spots 104a and 104c of the sub-beams are served for reading out the RF (reproduction) signal, focus support signal, and tracking servo signal respectively.

The wavefront aberration accumulated on the way is removed from the beam emitted from the laser diode 91 by the diffusion angle conversion hologram 97, and the beam is ideal spherical wave 105. Accordingly, the incident beam onto the object lens 15 is ideal spherical wave 105, and the size of the spot focused on the magneto-optical disk 12, which spot is diaphragmed to the diffraction limit, by the object lens 15 is ideal, and the information is therefore recorded or reproduced easily.

The returning beams of the main beam and sub-beams reflected by the recording medium surface 12a of the magneto-optical disk 12 pass through the surface 95e of the optical guide member 95, and is incident onto the first beam splitter film 99 again. The first beam splitter film 99 exhibits a certain reflectance for the beam having the oscillation component (S polarization component) parallel to the incident beam, and exhibits the approximately 100% transmittance for the beam having the oscillation component (P polarization component) perpendicular to the incident plane.

The beam which has passed through the first beam splitter film 99 out of the returning beam from the magneto-optical disk 12 is incident onto the second beam splitter film 101 formed on the slant surface 95c. Like the first beam splitter film 99, the second beam splitter film 101 exhibits a certain reflectance for the beam having the oscillation component (S polarization component) parallel to the incident beam, and exhibits the approximately 100% transmittance for the beam having the oscillation component (P polarization component) perpendicular to the incident plane.

The reflected beam 108 out of the beam incident into the second beam splitter film 101 is incident into an astigmatism generation hologram 100 formed on the second slant surface 95b. The incident beam is reflected by the astigmatism generation hologram 100 with generation of astigmatism, and reaches to a reflection film 109 formed on the third slant surface 95c. The beam reflected by the reflection film 109 is reflected by a reflection film 110 formed on the second slant surface 95b, and the returning main beam and sub-beams reach the PDIC 103.

The PDIC 103 converts the detected beam signal into an electric signal depending on the quantity of beam. The converted electric signal is supplied to an operation unit not shown in the drawing, and a focus error signal is generated based on the astigmatism method. The tracking error signal is generated based on 3 beam method.

Next, a method for equalizing the stray beam offset generated in the focus error signal, tracking error signal, MORF signal, and FAPC (Front Automatic Power Control) signal to 0 (offset) is described with reference to FIG. 11.

Figure 11A:
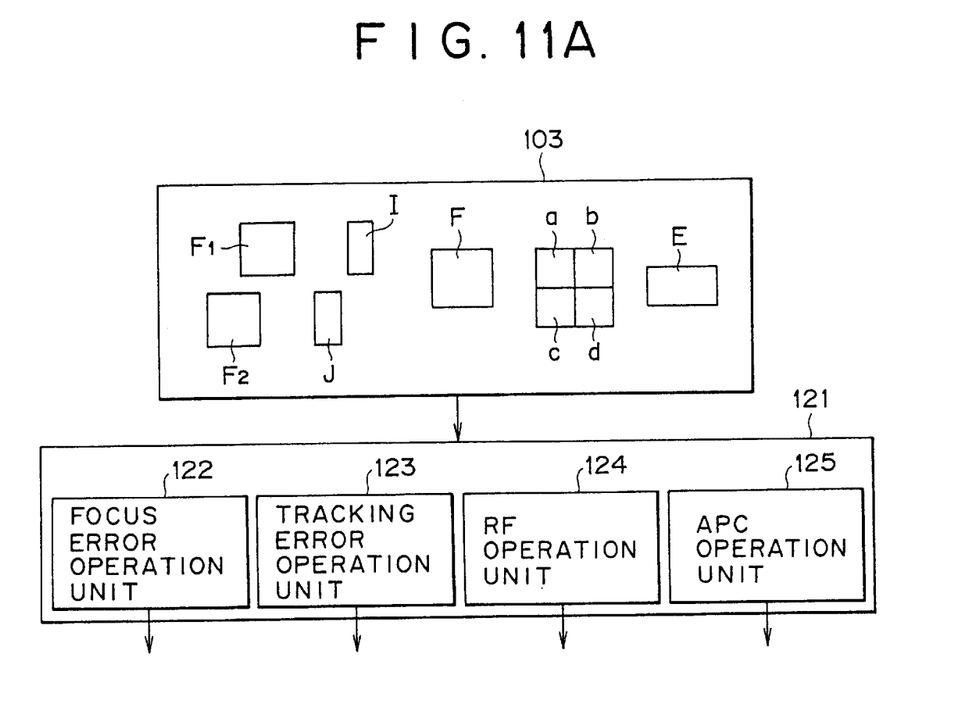
FIG. 11A and FIG. 11B are diagrams for describing a PDIC 103.

As shown in FIG. 11A, the PDIC 103 is provided with focus error signal generation photo diodes a to d, tracking error signal generation photo diodes E and F, MORF signal generation photo diodes I and J, and FAPC signal generation photo diodes $F_1$ and $F_2$ thereon.

A focus error operation unit 122, a tracking error operation unit 123, an RF operation unit 124, and an APC operation unit 125 of an operation unit 121 compute the equations (5) to (8) respectively to generate a focus error signal, tracking error signal, MORF signal, and FAPC signal respectively.

$$\text{Focus error signal} = (a+d)-(b+c) \quad (5)$$

$$\text{Tracking error signal} = E-F \quad (6)$$

$$\text{MORF signal} = I-J \quad (7)$$

$$\text{FAPC signal} = F_1+F_2 \quad (8)$$

In the above-mentioned equations (5) to (8), characters represents the output of the photo diode having the area which is represented by the corresponding character.

An absorptive film (not shown in the drawing) for preventing the stray beam is formed on the second surface 95b shown in FIG. 9. In the case that the absorptive film is removed, the intensity distribution of the stray beam is generated in the photo diodes a to d shown in FIG. 11A. For example, in the case that the intensity ratio of the stray beam is a:b:c:d=1.2:1:1:0.9, the stray beam offset generated in the focus error signal is proportional to 0.1 according to the equation (5).

Figure 11B:
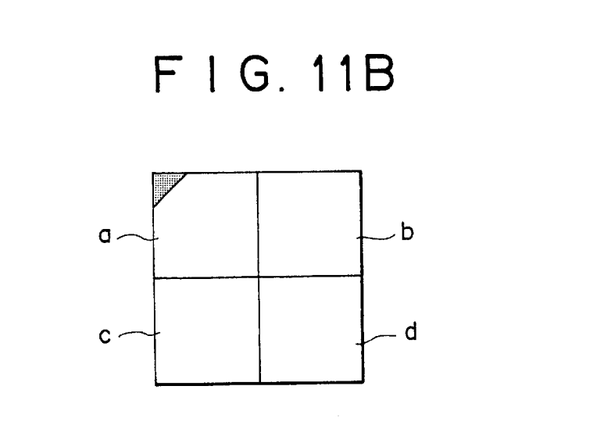

As shown in FIG. 11B, the left top predetermined portion of the photo diode a is removed to reduced the area of beam receiving surface of the photo diode a, and the stray beam offset is thereby reduced to approximately 0. By employing this method, the absorptive film for stray beam prevention is made needless.

In the case that the absorptive film is removed, the stray beam level detected by the photo diodes E and F is differentiated, and the stray beam offset is generated in the tracking error signal according to the equation (6). By adjusting the configuration of the photo diodes E and F as in the case of the above-mentioned focus error signal, the stray beam offset generated in the tracking error signal is equalized approximately to 0.

Also in the case of MORF signal, though the stray beam offset is generated according to the equation (7), the stray beam offset generated in MORF signal is equalized approximately to 0 by adjusting the configuration of the photo diodes I and J in the same manner.

The stray offset can not be equalized to 0 due to dispersion in manufacturing even though the configuration of the photo diode is optimized in the present embodiment. Generation of the maximum stray beam offset is prevented by equalizing the dispersion center value to 0 even in such case.

What is claimed is:

1. An optical information recording/reproduction apparatus, comprising:

light emitting means for emitting a beam to an optical recording medium;

light receiving means for receiving a returning beam from said recording medium disposed near said light emitting means, wherein said light emitting means and said light receiving means are contained in a unit, so as to compose a pickup module;

focus error operation means for computing a focus error signal using an electric signal generated from said light receiving means; and tracking error operation means for computing a tracking error signal using an electric signal generated from said light receiving means, wherein:

the area of said light receiving means is optimized so as to reduce the offset of an electric signal sent out to at least one of said focus error operation means and said tracking error operation means, said offset being caused by stray light, said light receiving means comprises a plurality of receiving sections, and the light receiving area of each light receiving section is set to be a predetermined area ratio depending on the intensity distribution of the incident stray light, and said stray light being caused by said light emitting means and incidence of said stray light is directly carried out to said light receiving means from said light emitting means.

2. The optical information recording/reproduction apparatus as claimed in claim 1, wherein said focus error operation means performs operation based on the spot size before and after returning focus.

3. The optical information recording/reproduction apparatus as claimed in claim 1, wherein said focus error operation means performs operation based on the Foucault method.

4. The optical information recording/reproduction apparatus as claimed in claim 1, wherein said focus error operation means performs operation based on the astigmatism method.

5. The optical information recording/reproduction apparatus as claimed in claim 1, wherein said tracking error operation means performs operation based on 3-beam method.

6. The optical information recording/reproduction apparatus as claimed in claim 1, wherein said tracking error operation means performs operation based on the push-pull method.

7. The optical information recording/reproduction apparatus as claimed in claim 1, wherein the area of said light receiving means is optimized so that the offset of an electric signal is equalized to approximately 0.

8. The optical information recording/reproduction apparatus as claimed in claim 1, wherein said returning beam is separated into a plurality of separated beams, and said plurality of separated beams include first, second and third separated beams;

said light receiving means including a plurality of photo diodes, said plurality of photo diodes including first, second and third photo diodes;

said first diode receiving said first separated beam, said second diode receiving said second separated beam, said third diode receiving said third separated beam;

said electric signal being generated from said first, second and third photo diodes.

9. The optical information recording/reproduction apparatus as claimed in claim 1, wherein said light receiving means including a plurality of photo diodes, the area of said plurality of photo diodes being optimized so that said offset is reduced.

10. The optical information recording/reproduction apparatus as claimed in claim 1, wherein said light receiving means including a plurality of photo diodes, at least one of said plurality of photo diodes being asymmetrical.

11. The optical information recording/reproduction apparatus as claimed in claim 1, wherein said plurality of receiving sections is disposed adjacent each other.

12. The optical information recording/reproduction apparatus as claimed in claim 1, wherein said optical recording medium is a recordable optical disk.

13. An optical pickup apparatus comprising:

a light emitting means, including a laser diode, for emitting a beam to an optical recording medium;

light receiving means, including at least one photodiode, for receiving a returning beam from said recording medium disposed near said light emitting means, wherein said laser diode and said photodiode are contained in a unit, so as to compose a pickup module;

focus error operation means for computing a focus error signal using an electric signal generated from said light receiving means; and tracking error operation means for computing a tracking error signal using an electric signal generated from said light receiving means, wherein:

the area of said light receiving means is optimized so as to reduce the offset of an electric signal sent out to at least one of said focus error operation means and said tracking error operation means, said offset being caused by stray light, said light receiving means comprises a plurality of light receiving sections, and the light receiving area of each light receiving section is set to be a predetermined area ratio, said plurality of light receiving sections are disposed adjacent each other, and the area ratio is set depending on the intensity distribution of the incident stray light, and said stray light being caused by said light emitting means and incidence of said stray light is directly carried out to said light receiving means from said light emitting means.

14. The optical pickup apparatus as claimed in claim 13, wherein said focus error operation means performs operation based on the spot size before and after returning focus.

15. The optical pickup apparatus as claimed in claim 13, wherein said focus error operation means performs operation based on the Foucault method.

16. The optical pickup apparatus as claimed in claim 13, wherein said focus error operation means performs operation based on the astigmatism method.

17. The optical pickup apparatus as claimed in claim 13, wherein said tracking error operation means performs operation based on 3-beam method.

18. The optical pickup apparatus as claimed in claim 13, wherein said tracking error operation means performs operation based on the push-pull method.

19. The optical pickup apparatus as claimed in claim 13, wherein said light receiving means comprises a plurality of light receiving sections, the area of each light receiving section is set to be a predetermined area.

20. The optical pickup apparatus as claimed in claim 19, wherein said plurality of light receiving sections are disposed adjacent each other, and the area of each light receiving section is set depending on the intensity distribution of the incident stray light.

21. The optical pickup apparatus as claimed in claim 13, wherein said returning beam is separated into a plurality of separated beams, and said plurality of separated beams include first, second and third separated beams;

said light receiving means including a plurality of photo diodes, said plurality of photo diodes including first, second and third photo diodes;

said first diode receiving said first separated beam, said second diode receiving said second separated beam, said third diode receiving said third separated beam;

said electric signal being generated from said first, second and third photo diodes.

22. The optical pickup apparatus as claimed in claim 13, wherein said light receiving means including a plurality of photo diodes, the area of said plurality of photo diodes being optimized so that said offset is reduced.

23. The optical pickup apparatus as claimed in claim 13, wherein the area of said light receiving means is optimized so that the offset of an electric signal is equalized to approximately 0.

24. The optical pickup apparatus as claimed in claim 13, wherein said light receiving means including a plurality of photo diodes, at least one of said plurality of photo diodes being asymmetrical.

* * * * *